United States Patent
Funakubo

(10) Patent No.: US 10,061,276 B2
(45) Date of Patent: Aug. 28, 2018

(54) MACHINE LEARNING SYSTEM AND MAGNETIZER FOR MOTOR

(71) Applicant: FANUC CORPORATION, Yamanashi (JP)

(72) Inventor: Makoto Funakubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/273,704

(22) Filed: Sep. 23, 2016

(65) Prior Publication Data

US 2017/0090432 A1  Mar. 30, 2017

(30) Foreign Application Priority Data

Sep. 30, 2015 (JP) .................................. 2015-194541

(51) Int. Cl.
- *G05B 13/00* (2006.01)
- *G05B 13/02* (2006.01)
- *H02P 21/06* (2016.01)

(52) U.S. Cl.
CPC .......... *G05B 13/0265* (2013.01); *H02P 21/06* (2013.01)

(58) Field of Classification Search
USPC ......... 318/561, 400.32, 400.37, 400.38, 121, 318/400.12
See application file for complete search history.

(56) References Cited

U.S. PATENT DOCUMENTS

| | | | |
|---|---|---|---|
| 2003/0030408 A1* | 2/2003 | Ratz | F23N 1/062 318/772 |
| 2008/0018288 A1* | 1/2008 | Malrait | H02P 21/16 318/721 |
| 2009/0146231 A1* | 6/2009 | Kuper | G01R 33/07 257/421 |

(Continued)

FOREIGN PATENT DOCUMENTS

| | | |
|---|---|---|
| CN | 102016730 A | 4/2011 |
| CN | 102598468 A | 7/2012 |

(Continued)

OTHER PUBLICATIONS

Ayato Nakama et al., "Application of modular reinforcement learning to the control of robot having three different sensors", IEICE Technical Report, NC2008-154 (Mar. 2009), pp. 301-306, vol. 108, No. 480, The Institute of Electronics, Information and Communication Engineers, Japan, for which an explanation of relevance is attached.

(Continued)

*Primary Examiner* — Eduardo Colon Santana
*Assistant Examiner* — Iftekhar Mustafa
(74) *Attorney, Agent, or Firm* — Hauptman Ham, LLP

(57) ABSTRACT

A machine learning system according to an embodiment of the present invention includes a state observer for observing the winding temperature, winding resistance, current value, and rotor magnetic flux density of a magnetization unit having a magnetizing yoke and windings; a reward calculator for calculating a reward from the rotor magnetic flux density obtained by the state observer; and a learning unit for updating an action value table based on a magnetization rate calculated from the rotor magnetic flux density and a target magnetic flux density, the winding temperature, and the winding resistance.

3 Claims, 5 Drawing Sheets

(56) References Cited

U.S. PATENT DOCUMENTS

2012/0223670 A1    9/2012  Kinjo et al.

FOREIGN PATENT DOCUMENTS

| | | |
|---|---|---|
| JP | 8-210806 A | 8/1996 |
| JP | 9-168260 A | 6/1997 |
| JP | 11-252873 A | 9/1999 |
| JP | 2000-137717 A | 5/2000 |
| JP | 2006-173447 A | 6/2006 |
| JP | 2009-268191 A | 11/2009 |
| JP | 2010-258627 A | 11/2010 |
| JP | 2011-517807 A | 6/2011 |
| WO | 2012/032776 A1 | 3/2012 |

OTHER PUBLICATIONS

Richard S. Sutton et al., "Reinforcement Learning: An Introduction", MIT Press, Mar. 1, 1998, Cambridge, MA, 4pp.

Ying-Chung Wang et al., "Reinforcement Fuzzy-Neural Adaptive Iterative Learning Control for Nonlinear Systems", 10th International Conference, Automation, Robotics and Vision, Dec. 17-20, 2008, pp. 733-738, Hanoi Vietnam, 6pp.

\* cited by examiner

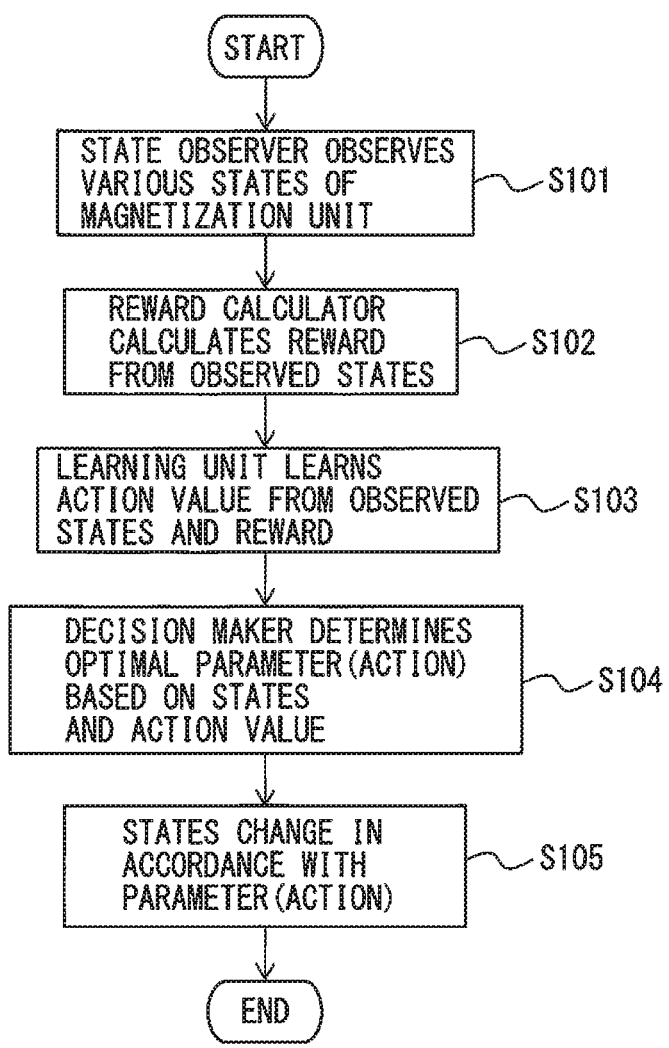

MACHINE LEARNING SYSTEM AND MAGNETIZER FOR MOTOR

RELATED APPLICATIONS

The present application claims priority to Japanese Patent Application Number 2015-194541 filed Sep. 30, 2015, the disclosure of which is hereby incorporated by reference herein in its entirety.

BACKGROUND OF THE INVENTION

1. Field of the Invention

The present invention relates to a machine learning system and a magnetizer for a motor, and in particular relates to a machine learning system and a magnetizer for a motor having the function of determining a voltage command to flow an optimal current for obtaining a desired magnetization rate.

2. Description of Related Art

To magnetize permanent magnets, it is necessary to apply a magnetic field the strength of which reaches the saturation point of the maximum magnetic flux density of a magnetic material, and magnetization units are used therefor. The magnetization units include a magnetizing yoke and windings for generating magnetic fields to provide a magnetic material with magnetic properties. As an example of the magnetization unit, a capacitor discharge magnetization unit in which a capacitor is charged and energy accumulated in the capacitor is discharged into the magnetizing yoke to generate a strong magnetic field is known.

FIG. 1 shows an example of a circuit of a conventional magnetization unit (for example, Japanese Unexamined Patent Publication (Kokai) No. 2006-173447). The conventional magnetization unit includes a phase control circuit 1001 for controlling the phase of an alternating voltage, a step-up transformer 1002 for multiplying the voltage, a rectifier circuit 1003 for rectifying the multiplied voltage, a capacitor $C_1$ to be charged with the rectified voltage, a switching element $SCR_1$ for magnetization connected in parallel with the capacitor $C_1$, and a magnetizing winding $L_1$. In the conventional magnetization unit, upon the conduction of the $SCR_1$ by an ignition pulse, a magnetizing current is supplied to the magnetizing winding $L_1$. As a result of a back electromotive force generated in the magnetizing winding $L_1$ from the time of the charged voltage of the capacitor $C_1$ reaching zero, a circulating current flows through a flywheel diode $D_1$. The circulating current of the flywheel diode $D_1$ prevents heat generation in the winding, and regenerates the back electromotive energy.

When magnetizing a rotor made of a magnetic material in the conventional magnetization unit, a current flows at a constant voltage. However, in the case of magnetizing many rotors in a continuous manner, a copper wire constituting the magnetizing winding of the magnetization unit will gradually increase in temperature and hence increase in resistance, thus causing a reduction in the current flowing through the magnetizing winding. As a result, the magnetization rate of the rotors is reduced, so that a high magnetization rate cannot be maintained. Furthermore, the reduction in the magnetization rate of the rotor brings about a reduction in the torque of a motor.

SUMMARY OF THE INVENTION

The present invention aims at providing a magnetization unit that improves stability in the production quality of a rotor and improves stability in the torque of a motor.

A machine learning system according to an embodiment of the present invention includes a state observer for observing the winding temperature, winding resistance, current value, and rotor magnetic flux density of a magnetization unit having a magnetizing yoke and windings; a reward calculator for calculating a reward from the rotor magnetic flux density obtained by the state observer; and a learning unit for updating an action value table based on a magnetization rate calculated from the rotor magnetic flux density and a target magnetic flux density, the winding temperature, and the winding resistance.

A magnetizer for a motor according to an embodiment of the present invention includes the above-described machine learning system and the magnetization unit having the magnetizing yoke and the windings.

BRIEF DESCRIPTION OF THE DRAWINGS

The objects, features, and advantages of the present invention will be more apparent from the following description of an embodiment in conjunction with the attached drawings, wherein:

FIG. 5 is a flowchart of the operation process of the machine learning system according to the embodiment of the present invention;

DETAILED DESCRIPTION OF THE INVENTION

A machine learning system and a magnetizer for a motor according to the present invention will be described below with reference to the drawings.

Figure 2:
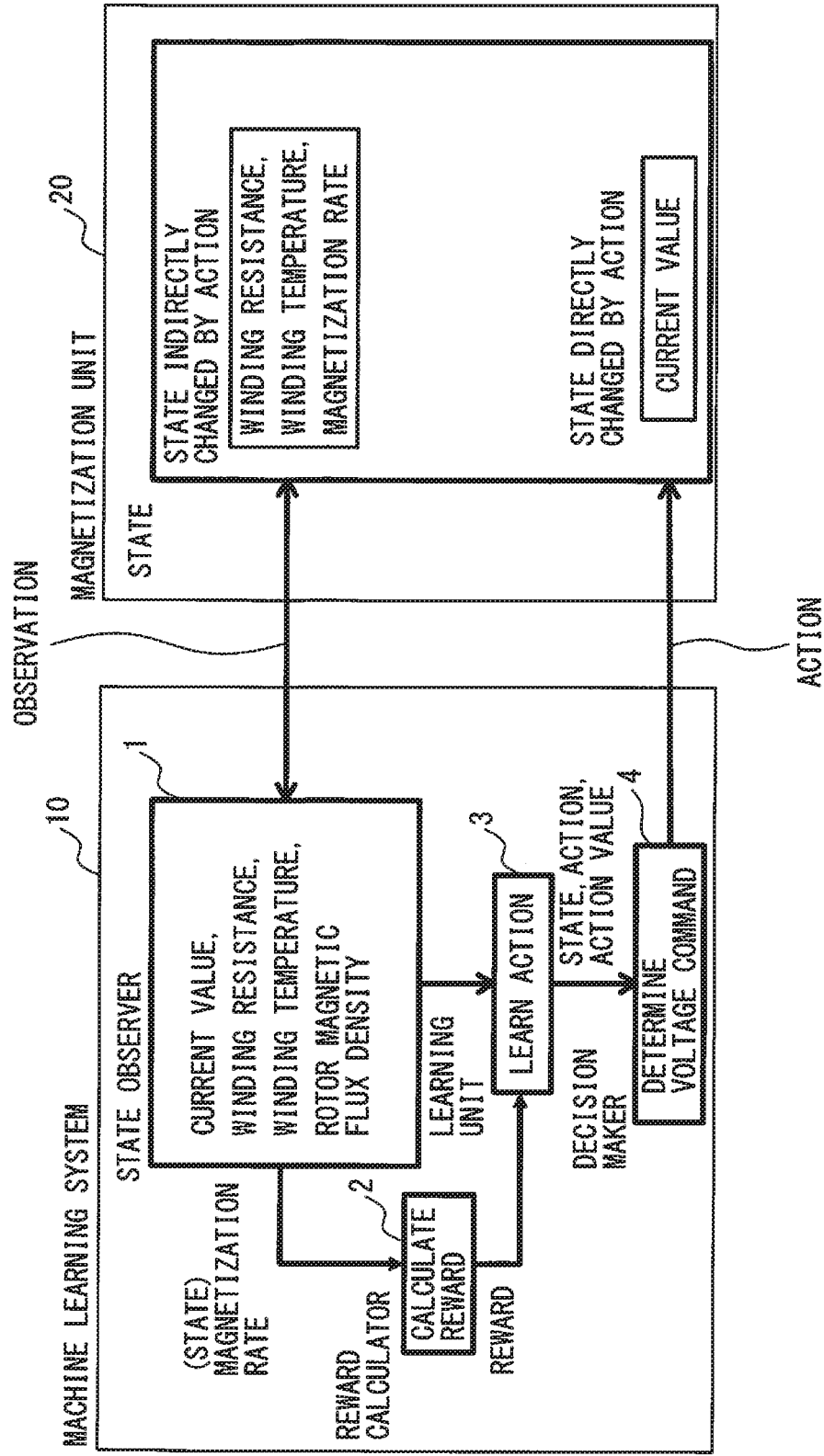
FIG. 2 is a block diagram of a machine learning system according to an embodiment of the present invention.

FIG. 2 is a block diagram of a machine learning system according to an embodiment of the present invention. A machine learning system 10 according to the embodiment of the present invention includes a state observer 1, a reward calculator 2, and a learning unit 3.

The state observer 1 observes the winding temperature, winding resistance, current value, and rotor magnetic flux density of a magnetization unit 20 having a magnetizing yoke and windings. However, these parameters are just examples, and another parameter may be instead observed.

The reward calculator 2 calculates a reward from the rotor magnetic flux density obtained by the state observer 1. A method for calculating the reward will be described later.

The learning unit 3 updates an action value table based on a magnetization rate calculated from the rotor magnetic flux density and a target magnetic flux density, the winding temperature, and the winding resistance. A method for updating the action value table will be described later.

The machine learning system 10 preferably further includes a decision maker 4 for determining a voltage command based on the action value table of the learning unit 3.

In this embodiment, a winding resistance R is corrected considering the fact that the winding resistance varies depending on a winding temperature Ta detected in the magnetization unit 20, instead of regarding the winding resistance R as constant. A winding resistance $R_a$ after the correction is calculated by the following copper wire resistance equation:

$$R_a=(234.5+T_a)/(234.5+T_0)\times R_0$$

where $R_0$ [Ω] is a reference resistance at a reference temperature $T_0$ [° C.], and 234.5 is a copper temperature coefficient. In this embodiment, the corrected winding resistance $R_a$ is used as a resistance for determining a current to obtain a desired magnetic flux density.

Next, the method for calculating the reward will be described. By way of example, the reward calculator 2 may provide a negative reward when the magnetization rate is higher or lower than the specified range of a target magnetization rate, while the reward calculator 2 may provide a positive reward when the magnetization rate is within the specified range of the target magnetization rate. For example, the specified range of the target magnetization rate is assumed as 95 to 100%. At this time, if an obtained magnetization rate is 90%, which is below the specified range of the target magnetization rate, the reward calculator 2 provides a negative reward. On the other hand, if an obtained magnetization rate is 98%, which is within the specified range of the target magnetization rate, the reward calculator 2 provides a positive reward.

Figure 4:
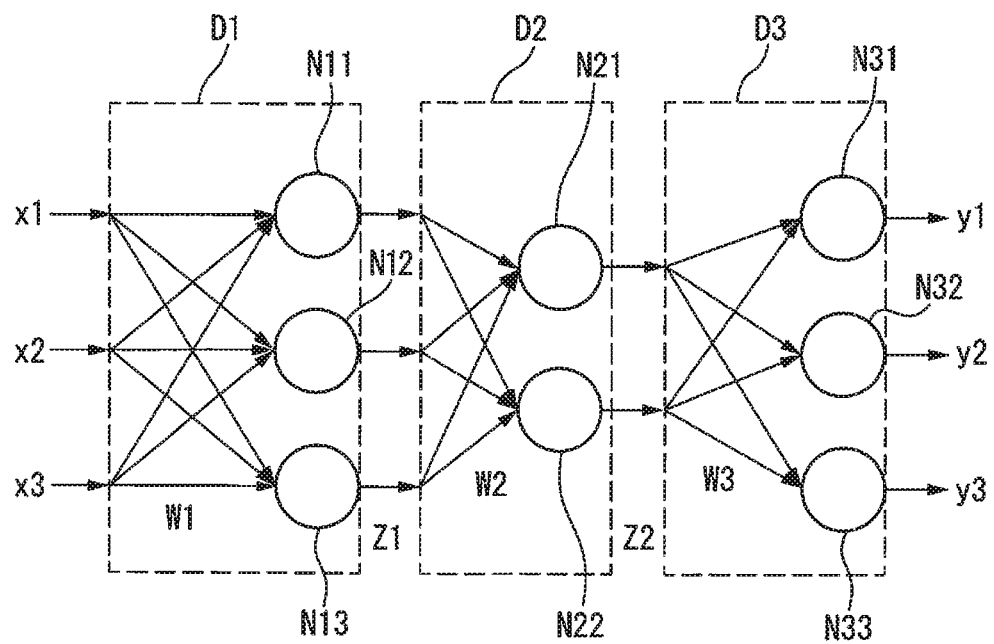
FIG. 4 is a schematic view of a three-layer neural network model.

The learning unit 3 preferably performs a computation of a state variable observed by the state observer 1 in a multilayer structure, and updates the action value table in real time. As a method for performing the computation of the state variable in the multilayer structure, for example, a multilayer neural network, as shown in FIG. 4, can be used.

Here, the machine learning system 10 as shown in FIG. 2 will be described in detail. The machine learning system 10 has the function of learning knowledge, as well as the functions of extracting useful rules, knowledge representations, criteria, and the like from a data group inputted to the system by analysis and outputting determination results. There are various methods therefor, which are broadly divided into "supervised learning", "unsupervised learning", and "reinforcement learning". Moreover, when realizing these methods, a method called "deep learning" that learns the extraction of features themselves is used.

In "supervised learning", a large amount of data pairs of a certain input and a result (label) are provided to the machine learning system. The machine learning system learns features from the data set, and heuristically obtains a model to predict a result from an input, i.e., the relationship therebetween. In this embodiment, the supervised learning can be used for predicting a magnetization rate from the winding resistance and the winding temperature, and the like. This can be realized using an algorithm such as a neural network described later on.

In "unsupervised learning", only a large amount of input data is provided to the machine learning system. The machine learning system learns the distribution of the input data and applies compression, classification, alignment, or the like to the input data, without being supplied with corresponding output data as supervisors. The features of the data set can be subjected to clustering by analogy. With the use of this result, while providing a certain criterion, an output is assigned so as to optimize the criterion, and this allows a prediction of the output. There is also a method called "semi-supervised learning" as an intermediate problem setting between the "supervised learning" and the "unsupervised learning", in which a part of the provided data includes pairs of an input and an output while the other includes only inputs. In this embodiment, the unsupervised learning uses data that can be obtained without actually operating the magnetization unit, in order to improve learning efficiency.

Problems in the reinforcement learning are determined as follows.

The magnetization unit observes an environment state and determines an action.

An environment varies in accordance with some rule, and additionally, an action itself can sometimes vary the environment.

A reward signal returns whenever an action is performed.

The aim is to maximize a total (discounted) reward in the future.

The learning is started from a state in which a result brought about by an action is unknown or insufficiently known. The magnetization unit can obtain the result as data, only after the magnetization unit has actually operated. I it is necessary to search for an optimal action through trial and error.

The learning may be started from a favorable start point by previously performing learning (using a method of the above-described supervised learning or inverse reinforcement learning) so as to mimic the action of a human in an initial state.

The "reinforcement learning" is a method for learning a sequence of optimal actions by learning, as well as determining and classifying, actions based on the interactions between the action and an environment, in other words, a learning method to maximize a total reward obtained in the future. In this embodiment, this indicates that a sequence of actions having an effect on the future can be obtained. The following description takes Q learning as an example, but is not limited thereto.

The Q learning is a method for learning a Q(s, a) value for choosing an action "a" in a certain environment state "s". In other words, in a certain state "s", an action "a" having the highest value of Q(s, a) is chosen as an optimal action. However, a correct Q(s, a) value as to a combination of a state "s" and an action "a" is not known in the beginning. Thus, an agent chooses various actions "a" in a certain state "s", and executing each action "a" in the state "s" provides the agent with a reward. Therefore, the agent learns to choose a better action, i.e., a correct Q(s, a) value.

The aim is to maximize a total reward to be obtained in the future, as a result of choosing a sequence of actions. Thus, the agent eventually aims at Q(s, a)=E [Σγ$^t r_t$] (an expected value is taken when the agent moves from state to state by performing a sequence of optimal actions. The sequence of optimal actions is not known as a matter of course, and hence has to be found while learning.). For example, an update equation for a Q(s, a) value is represented as follows:

$$Q(s_t, a_t) \leftarrow Q(s_t, a_t) + \alpha\left(r_{t+1} + \gamma\max_{a} Q(s_{t+1}, a) - Q(s_t, a_t)\right)$$

where $s_t$ represents an environment state at a time t, and $a_t$ represents an action at the time t. By executing the action $a_t$, the agent moves to a state $s_{t+1}$. The state change provides the agent with a reward $r_{t+1}$. A term with "max" represents the product of a Q value, when an action "a" having the highest Q value that has been known at that time is chosen in the state $s_{t+1}$, and γ. "γ" is a parameter of $0<\gamma \leq 1$ called discount factor. "α" is a learning rate in the range of $0<\alpha \leq 1$.

This equation indicates a method for updating a Q ($s_t$, $a_t$) value of an action $a_t$ in a state $s_t$ based on a reward $r_{t+1}$ that has returned as a result of the action $a_t$. This update equation indicates that, as compared with a Q($s_t$, $a_t$) value of an action "a" in a state "s", if a Q($s_{t+1}$, max $a_{t+1}$) value of an optimal action "max a" in the next state derived from a reward $r_{t+1}$ plus the action "a" is higher, Q($s_t$, $a_t$) is increased. If not, Q($s_t$, $a_t$) is decreased. In other words, the value of an action in a certain state is approximated to an optimal action value in the next state, i.e., derived from a reward returning as a result of the action and the action itself.

There are two methods for representing Q(s, a) values in a computer, i.e., a method in which Q values of all state-action pairs (s, a) are retained in a table (action value table) and a method in which a function for approximating Q(s, a) values is prepared. In a latter method, the above-described update equation can be realized by adjusting a parameter for an approximation function using a stochastic gradient descent method or the like. As the approximation function, a neural network is usable as described later on.

Figure 3:
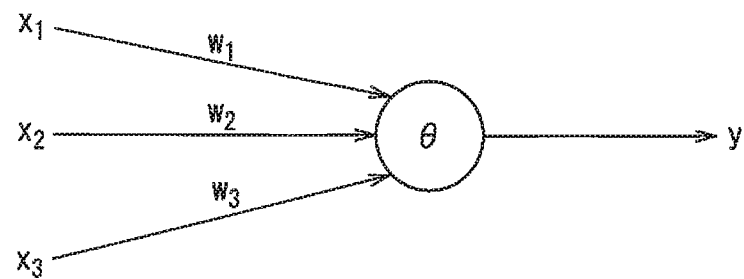
FIG. 3 is a schematic view of a model of a neuron.

As an approximation algorithm for a value function in the supervised learning, the unsupervised learning, and the reinforcement learning, a neural network can be used. The neural network is composed of, for example, an arithmetic unit, memory, and the like that imitate a model of a neuron as shown in FIG. 3. FIG. 3 is a schematic view of a model of a neuron.

As shown in FIG. 3, a neuron produces an output y in response to a plurality of inputs x (for example, inputs $x_1$ to $x_3$). To each of the inputs $x_1$ to $x_3$, a weight w ($w_1$ to $w_3$) corresponding to the input x is applied. Thus, the neuron produces the output y represented by the following equation. Note that, the input x, the output y, and the weight w are all in the form of a vector.

$$y = f_k(\Sigma_{i=1}^n x_i w_i - \theta)$$

Where θ is a bias, and $f_k$ is an activation function.

Next, a three-layer neural network into which the above-described neurons are combined will be described with reference to FIG. 4. FIG. 4 is a schematic view of a neural network having weights of three layers D1 to D3.

As shown in FIG. 4, a plurality of inputs x (for example, inputs x1 to x3) are inputted from the left of the neural network, and a result y (for example, results y1 to y3) is outputted from the right thereof.

To be more specific, the inputs x1 to x3 are inputted to each of the three neurons N11 to N13 while being weighted correspondingly. The weights applied to the inputs are collectively indicated by W1.

The neurons N11 to N13 output vectors Z11 to Z13, respectively. The vectors Z11 to Z13 are collectively indicated by a feature vector Z1, which is regarded as a vector that extracts a feature amount from the input vector. The feature vector Z1 is in between the weight W1 and a weight W2.

The vectors Z11 to Z13 are inputted to each of two neurons N21 and N22 while being weighted correspondingly. The weights applied to the feature vectors are collectively indicated by W2.

The neurons N21 and N22 output vectors Z21 and Z22, respectively. The vectors Z21 and Z22 are collectively indicated by a feature vector Z2. The feature vector Z2 is between the the weight W2 and a weight W3.

The feature vectors Z21 and Z22 are inputted to each of three neurons N31 to N33 while being weighted correspondingly. The weights applied to the feature vectors are collectively indicated by W3.

Finally, the neurons N31 to N33 output the results y1 to y3, respectively.

The neural network has a learning mode and a value prediction mode. In the learning mode, the weight W is learned using a learning data set. In the value prediction mode, the action of the magnetization unit is determined using the parameter obtained in the learning mode (the word of "prediction" is used for the sake of convenience, but various tasks including detection, classification, inference, and the like can be made).

The agent may immediately learn data, i.e., obtained by actually operating the magnetization unit in the prediction mode, and reflect the learning result in the next action (on-line learning). Also, the agent may collectively learn a data group collected in advance, and perform a detection mode thereafter using the parameter (batch learning). The agent may perform the learning mode whenever a certain amount of data is accumulated.

The weights W1 to W3 can be learned using an error back propagation algorithm (backpropagation algorithm). Information about an error enters from the right and propagates to the left. The error back propagation algorithm is a method in which the weights are adjusted (learned) with respect to each neuron so as to minimize the difference between an output y and an actual output y (supervisor) in response to an input x.

Such a neural network may have layers of more than three (called deep learning). An arithmetic unit that performs feature extraction from inputs in stages and regression of results can be automatically acquired only from supervisor data.

Figure 1:
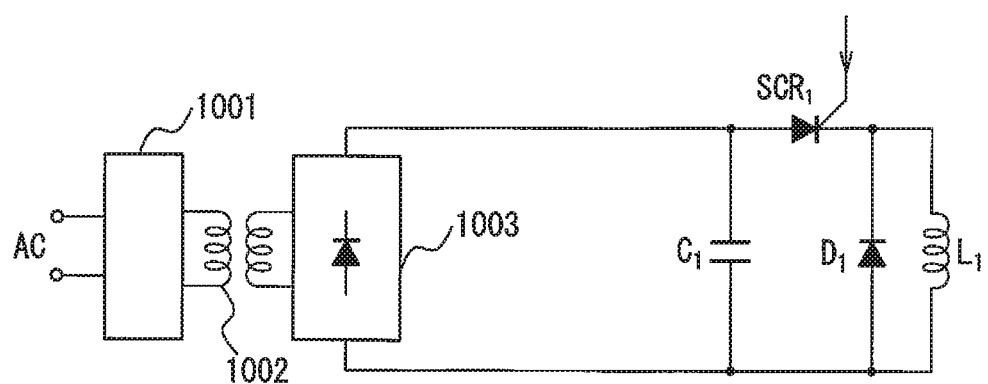
FIG. 1 is a circuit diagram of a conventional magnetization unit.

Accordingly, in order to perform the Q learning described above, as shown in FIG. 1, the machine learning system 10 according to this embodiment includes the state observer 1, the learning unit 3, and the decision maker 4. However, a machine learning method applied to the present invention is not limited to the Q learning. For example, in the instance of applying the supervised learning, a value function corresponds to a learning model, and a reward corresponds to an error.

As shown in FIG. 2, the state of the magnetization unit 20 includes a state indirectly changed by an action and a state directly changed by an action. The state indirectly changed by an action includes the winding resistance, the winding temperature, and the magnetization rate. The state directly changed by an action includes the current value.

The learning unit 3 updates the action values corresponding to the current state variable and actions to be taken in the action value table, based on the update equation and the reward.

The machine learning system 10 may be connected to the magnetization unit 20 through a network, and the state observer 1 may acquire the current state variable through the network. The machine learning system 10 is preferably present in a cloud server.

The machine learning system 10 may be contained in a magnetizer for a motor. In other words, the magnetizer for a motor may include the machine learning system 10 and the magnetization unit 20 having the magnetizing yoke and the windings.

In the example of FIG. 2, the own action value table is updated using the action value table updated by the learning unit of the own machine learning system, but is not limited thereto. In other words, the own action value table may be updated using an action value table updated by a learning unit of another machine learning system different from the own machine learning system.

Next, the operation of the machine learning system according to the embodiment of the present invention will be described. FIG. 5 is a flowchart of the operation process of the machine learning system according to the embodiment of the present invention.

First, in step S101, the state observer 1 observes the various states of the magnetization unit 20. In other words, the state observer 1 observes the winding temperature, the winding resistance, the current value, and the rotor magnetic flux density detected by the magnetization unit 20.

Next, in step S102, the reward calculator 2 calculates a reward from the observed states. For example, the reward calculator 2 provides a negative reward when the magnetization rate is beyond the specified range of the target magnetization rate, while the reward calculator 2 provides a positive reward when the magnetization rate is within the specified range of the target magnetization rate.

Next, in step S103, the learning unit 3 learns an action value from the observed states and the reward.

Next, in step S104, the decision maker 4 determines an optimal parameter (action) based on the states and the action value. For example, the decision maker 4 determines the parameter (the winding temperature, the winding resistance, and the current value) to obtain a desired magnetization rate.

Next, in step S105, the states change in accordance with the parameter (action). In other words, the magnetization unit 20 determines a voltage command to produce a current value for obtaining the desired magnetization rate.

Figure 6A:
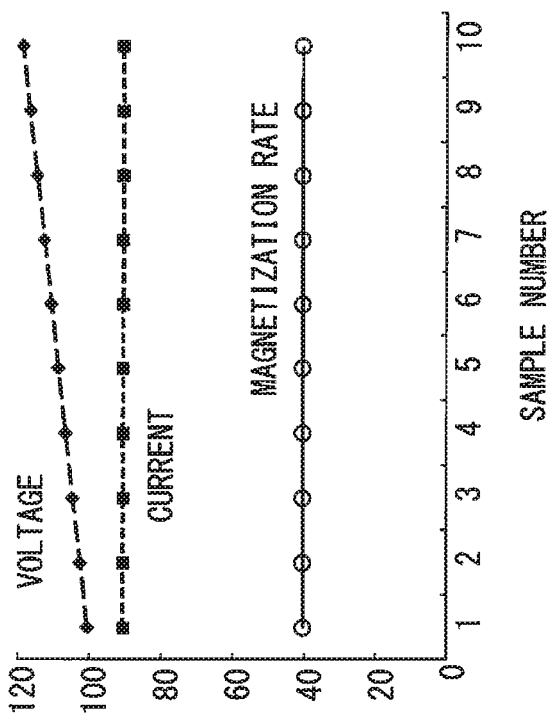
FIG. 6A is a graph showing a change in a magnetization rate before using the machine learning system according to the embodiment of the present invention.
Figure 6B:
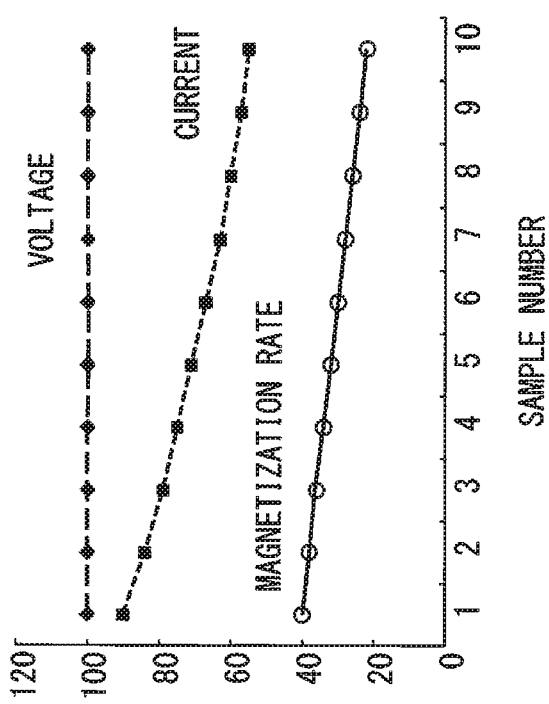
FIG. 6B is a graph showing a change in the magnetization rate after using the machine learning system according to the embodiment of the present invention.

The magnetization rate, which is the state directly changed by an action, reaches its target value in this manner. FIGS. 6A and 6B show an example of adjustment of the parameter according to the present invention. FIGS. 6A and 6B are graphs showing the characteristic of a magnetization rate before and after the adjustment of the parameter, respectively, by the machine learning system according to the embodiment of the present invention. FIG. 6A shows the voltage, current, and magnetization rate of a plurality of samples manufactured before the adjustment of the parameter. FIG. 6B shows the voltage, current, and magnetization rate of a plurality of samples manufactured with the adjustment of the parameter by the present invention. Note that, vertical axes are divided by arbitrary tick marks.

As shown in FIG. 6A, when the parameter is not adjusted, the current and the magnetization rate reduce with an increase in a sample number. This is because, with an increase in the sample number, the winding temperature increases and thus the resistance of a copper wire constituting the windings increases, and therefore a current flowing through the windings is reduced at a constant voltage.

On the other hand, the magnetizer for a motor according to the embodiment of the present invention adjusts the voltage command so as to obtain a current value with which a magnetization rate is within the specified range of the target magnetization rate, accounting for the fact that the resistance of the copper wire increases with an increase in the sample number, thus improving stability in the magnetization rate.

As described above, according to the machine learning system and the magnetizer for a motor according to the present invention, it is possible to automatically adjust a parameter for the magnetization unit by machine learning with respect to a desired magnetization rate, thus improving stability in the magnetization rate.

According to the machine learning system and the magnetizer for a motor according to the embodiment of the present invention, it is possible to provide the magnetization unit that improves stability in the production quality of a rotor and improves stability in the torque of the motor.

What is claimed is:
1. A magnetizer for manufacturing rotors for motors, the magnetizer comprising:
   a magnetization unit having a magnetizing yoke and windings configured to magnetize the rotors; and
   a machine learning system, comprising:
      a state observer configured to observe a winding temperature, a winding resistance, a current value, and a rotor magnetic flux density of the magnetization unit having the magnetizing yoke and windings; and
      a processor configured to
         calculate a reward from the rotor magnetic flux density obtained by the state observer, and
         update an action value table based on a magnetization rate calculated from the rotor magnetic flux density and a target magnetic flux density, the winding temperature, and the winding resistance,
         wherein the processor is configured to perform an arithmetic operation of a state variable observed by the state observer in a multilayer structure, and update the action value table in real time.
2. The magnetizer according to claim 1, wherein the processor is further configured to determine a voltage command based on the action value table.
3. The magnetizer according to claim 1, wherein the processor is further configured to update the action value table using an action value table updated by another machine learning system.

* * * * *